United States Patent
Kawashima et al.

[11] Patent Number: 5,966,356
[45] Date of Patent: Oct. 12, 1999

[54] OPTIMUM SLICE LEVEL SIGNAL READING APPARATUS FOR OPTICAL DISK

[75] Inventors: Hisanori Kawashima; Mitsuru Watanabe, both of Hachioji, Japan

[73] Assignee: Konica Corporation, Tokyo, Japan

[21] Appl. No.: 08/965,886

[22] Filed: Nov. 7, 1997

[30] Foreign Application Priority Data

Nov. 11, 1996 [JP] Japan ................................. 8-298463

[51] Int. Cl.$^6$ .................................................. G11B 5/09
[52] U.S. Cl. ............................................. 369/48; 369/59
[58] Field of Search ............................ 369/59, 124, 47, 369/48, 49, 50, 53, 54; 360/25, 26, 27, 32

[56] References Cited

U.S. PATENT DOCUMENTS

| | | | |
|---|---|---|---|
| 5,235,590 | 8/1993 | Taguchi et al. ........................ | 369/124 |
| 5,359,586 | 10/1994 | Izumi et al. ........................ | 369/124 X |
| 5,497,361 | 3/1996 | Mita et al. ............................ | 369/124 X |
| 5,592,456 | 1/1997 | Miyashita et al. ........................ | 369/59 |

*Primary Examiner*—Paul W. Huber
*Attorney, Agent, or Firm*—Finnegan, Henderson, Farabow, Garrett & Dunner, L.L.P.

[57] ABSTRACT

An apparatus for reading information from an optical disk, comprises a rotator to rotate the optical disk, a detector to detect optical information from the optical disk and to output signals, AC coupling section to eliminate signal components lower than a predetermined cut-off frequency from the signals, a slice level signal generator to generate slice level signals from a peak value and a bottom value of the signals; and a data outputting section to obtain data outputs from the signals and the slice level signals.

3 Claims, 9 Drawing Sheets

FIG. 10 (a)
FIG. 10 (b) OUTPUT DATA
FIG. 10 (c) REFERENCE CLOCK

OPTIMUM SLICE LEVEL SIGNAL READING APPARATUS FOR OPTICAL DISK

BACKGROUND OF THE INVENTION

The present invention relates to a signal reading apparatus for an optical disk.

As an optical disk medium (recording medium of an optical disk apparatus), there are given, for example, CD (compact disk), MO (Magneto Optical disk) and DVD (digital video disk). In these disks, a recording surface is formed on a base board which is optically transparent such as polycarbonate, and data reading and data writing are conducted through this transparent base board.

Figure 6:
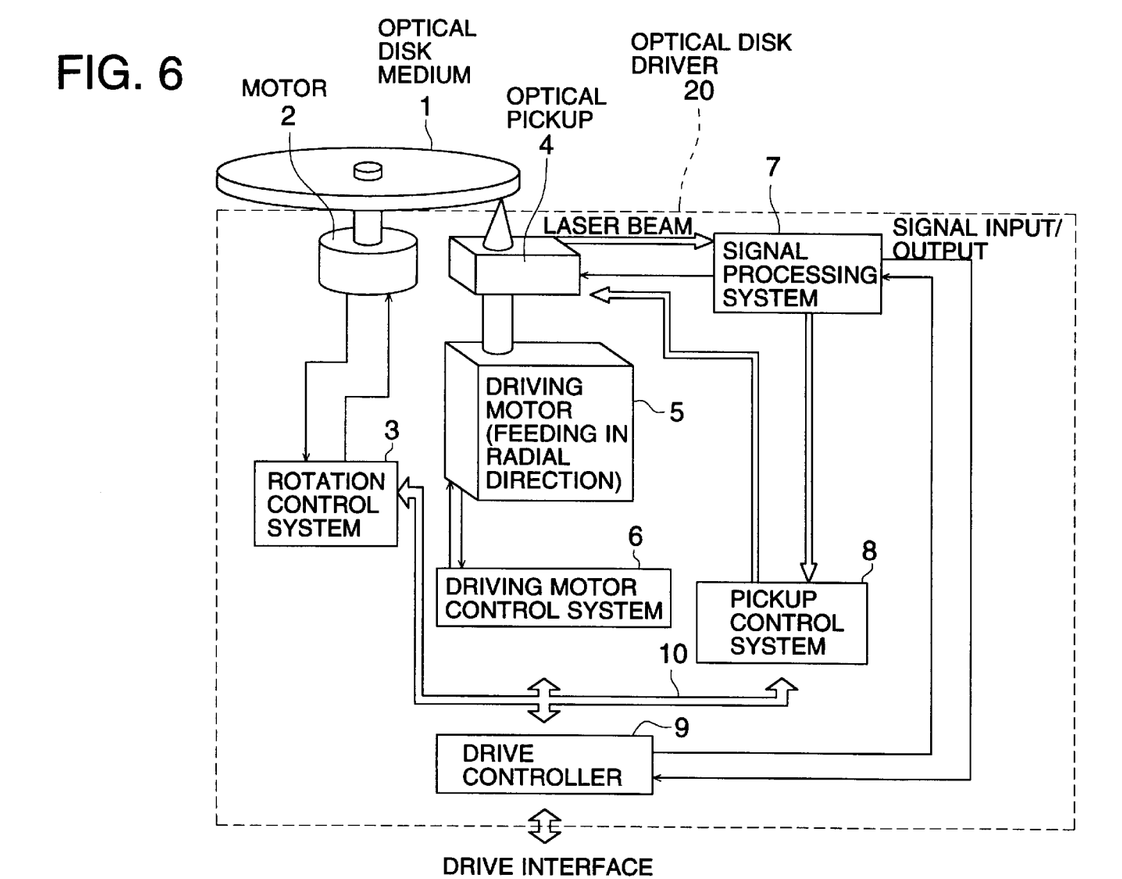
FIG. 6 is a structure concept diagram of an optical disk apparatus.

FIG. 6 is a conceptual diagram of an optical disk apparatus of this kind. The optical disk apparatus is composed of optical disk medium (CD, MO and DVD mentioned above) 1 and optical disk driver (portion enclosed with dashed lines) 20. The optical disk driver 20 records and reproduces information by applying a spot of a fine laser beam converged to 1 µm or less in terms of diameter, while rotating the optical disk medium 1.

The optical disk medium 1 is rotated at a prescribed speed by motor 2 which is controlled by rotation control system 3. Optical pickup 4 provided in the vicinity of the surface of the optical disk medium 1 applies a light beam to the optical disk medium 1 from a light source such as a laser diode. In this case, the optical pickup 4 is moved in the radial direction of the optical disk medium 1 by driving motor 5 which is controlled by driving motor control system 6.

In these operations, the optical disk medium 1 is irradiated with a light beam from the optical pickup 4 which is controlled by pickup control system 8, and its reflected light enters signal processing system 7 through the optical pickup 4 to be converted to digital data. Drive controller 9 is connected, through bus 10, with the rotation control system 3, the driving motor control system 6 and pickup control system 8, and it exchanges data with external equipment (not shown) through a drive interface. The drive controller 9 and the signal processing system 7 are connected with each other through signal lines, and exchange of data and control signals is carried out between them.

Figure 7:
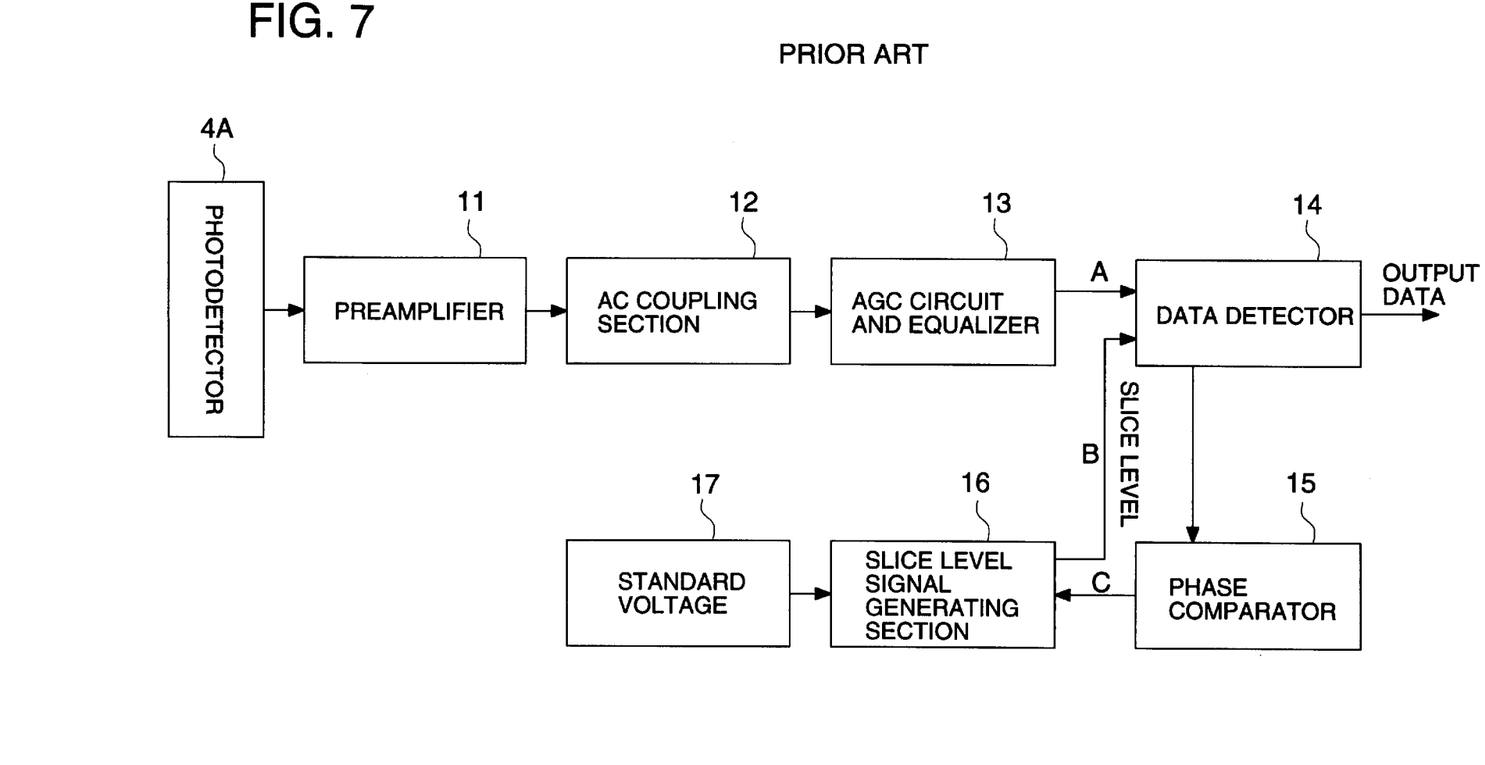
FIG. 7 is a block diagram showing an example of the structure of a conventional apparatus.

The invention is related to the signal processing system 7 within the structure shown in FIG. 6. FIG. 7 is a block diagram showing an example of the structure of the signal processing system 7 shown in FIG. 6. Reflected light from the optical disk medium 1 shown in FIG. 6 is converted by photodetector 4A which constitutes the optical pickup 4 into electrical signals which are then amplified by preamplifier 11.

In an output of the preamplifier 11, double refraction owned by the optical disk medium and DC (direct current) components caused when the non-signal state is changed to the signal state are superposed, and they are varied. For removing this DC component, an output of the preamplifier 11 enters AC coupling section 12, and signal components having the prescribed value or higher of frequency only are transmitted. In this case, cut-off frequency of the AC coupling section 12 is about 50 kHz or less which is a high frequency.

An output (reading signal) of the AC coupling section 12 enters AGC circuit and equalizer 13, whereby amplitude of the signal is made to be constant automatically, and noise components are removed by a filter. In this way, the output (reading signal) of the AGC circuit and equalizer 13 turns into the signal having no noise. Output A of AGC circuit and equalizer 13 enters an input on the one side of the data detector 14.

Into an input on the other side of the data detector 14, there is inputted slice level signal B. Then the data detector 14 compares output A of the AGC circuit and equalizer 13 with slice level signal B, and converts it into binary data composed of "0" and "1". From the data detector 14, there are outputted binary-coded output data.

On the other hand, binary data signals are outputted from the data detector 14 to phase comparator 15, and the phase comparator 15 obtains phase difference $\Delta\theta$ between reference clock and the binary data, and outputs this phase difference $\Delta\theta$ to slice level signal generating section 16 as error signal C. The slice level signal generating section 16 receives error signals from both standard voltage 17 and phase comparator 15, and outputs the value obtained by correcting the standard voltage with error signal C as slice level signal B of the data detector 14. Namely, in the case of a conventional apparatus, a reading signal is first compared with standard voltage, then a slice level is moved based on the error signal C so that reading signal A is compared with slice level B. The standard voltage 17 is generated from an unillustrated standard voltage generating circuit.

The data detector 14 compares output A of AGC circuit and equalizer 13 with slice level B, and then converts signals detected by photodetector 4A into binary data which serve as output data.

Figure 8A:
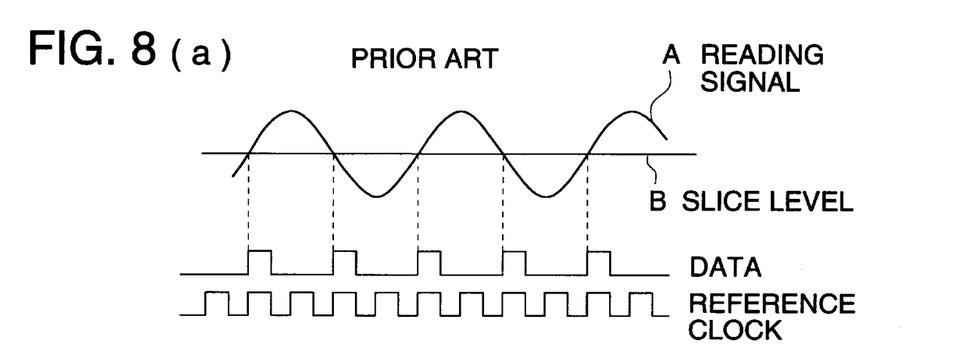
FIGS. 8(a) to 8(c) are time charts showing operations of the conventional apparatus.

FIG. 8 is a time chart showing operations of a conventional apparatus, and operations of the data detector 14 to generate binary data are shown. FIG. 8 (a) shows the state wherein slice level B and reading signal A are balanced. The output data are generated each time the reading signal A crosses slice level B.

Figure 8B:
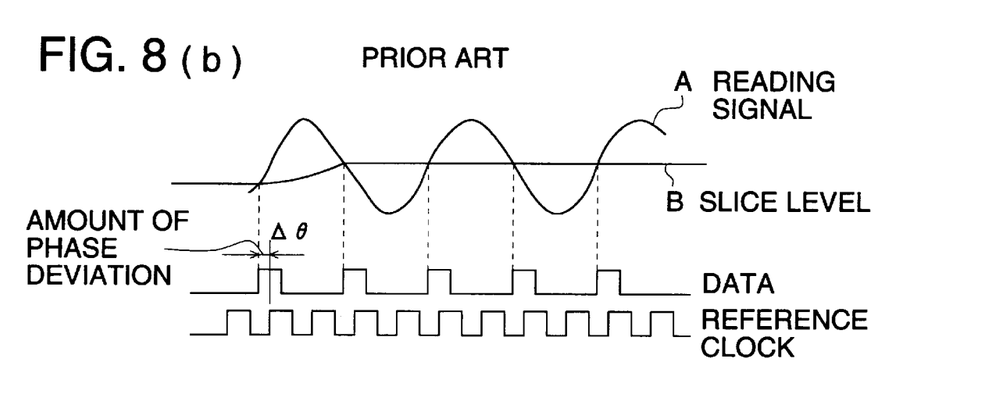

FIG. 8 (b) shows the state wherein slice level B is under the reading signal first, and output data are outputted, preceding a reference clock. Phase difference (amount of phase deviation) $\Delta\theta$ between the reference clock and output data in this case is calculated in the phase comparator 15 in FIG. 7, and is supplied to the slice level signal generating section 16 as error signal C.

The slice level signal generating section 16, when it receives the error signal C, corrects standard voltage 17 with the error signal and corrects the slice level B upward so that the slice level B may be in the normal position against reading signal A.

Figure 8C:
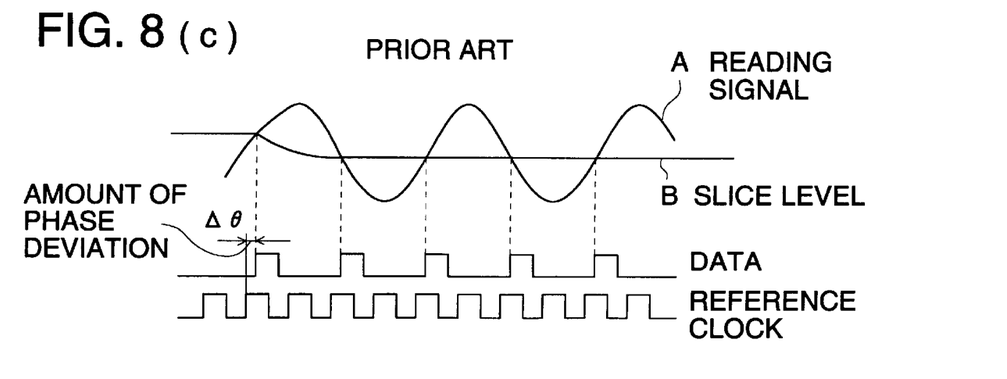

In the case of FIG. 8 (c), it shows an occasion wherein slice level B is positioned over the reading signal first, and output data are outputted falling behind the reference clock. Phase difference (amount of phase deviation) $\Delta\theta$ between the reference clock and output data in this case is calculated in the phase comparator 15 in FIG. 7, and is supplied to the slice level signal generating section 16 as error signal C.

The slice level signal generating section 16, when it receives the error signal C, corrects standard voltage 17 with the error signal and corrects the slice level B downward so that the slice level B may be in the normal position against reading signal A.

Figure 5A:
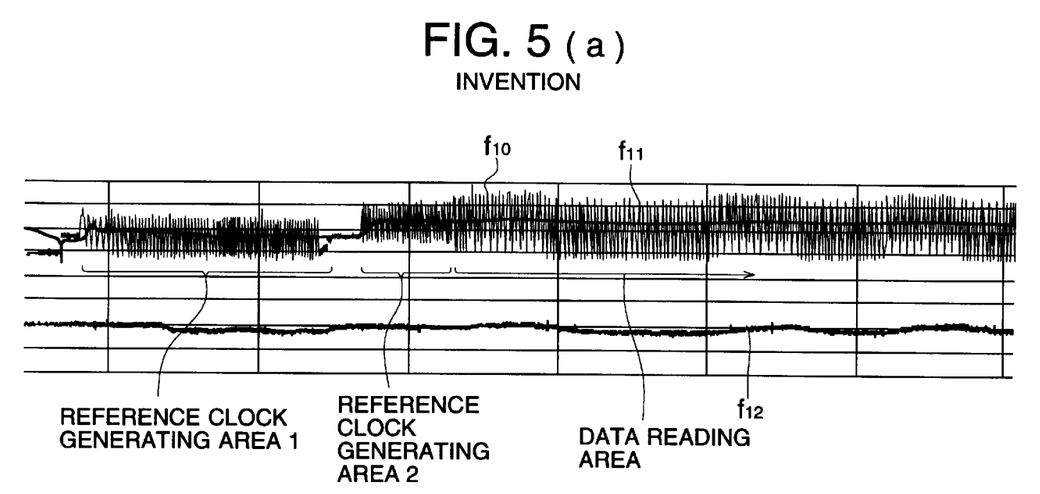
FIGS. 5(a) and 5(b) are waveforms.
Figure 5B:
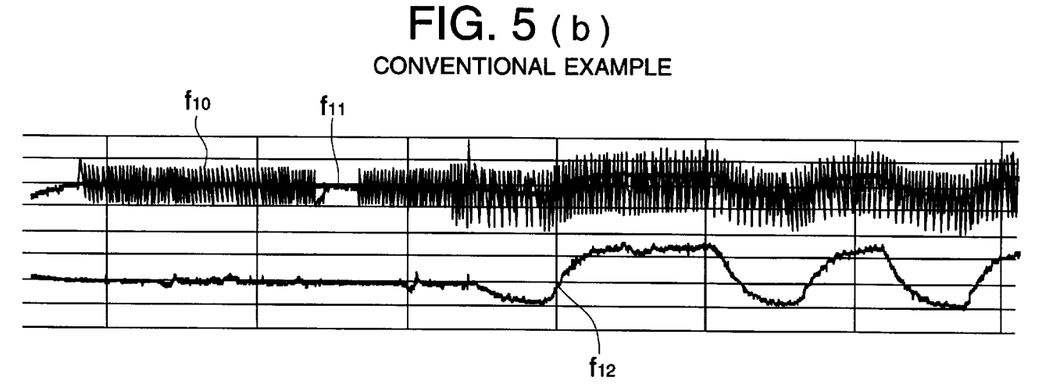

Since the cut-off frequency of the AC coupling section 12 is set to about 50 kHz which is slightly higher in the conventional apparatus stated above, the DC level of its output is varied greatly as shown on $f_{12}$ in FIG. 5 (b) (FIG. 5 is a diagram of effects of the invention). Synchronizing with this variation of DC level, reading signal waveform $f_{10}$ and slice level $f_{11}$ are also varied.

Figure 9A:
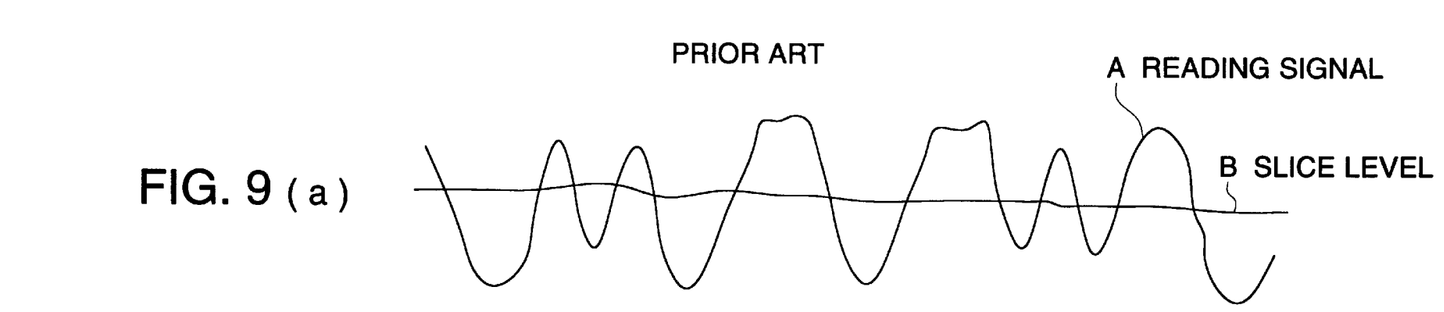
FIGS. 9(a) to 9(c) are diagrams of normal operations of the conventional apparatus.
Figure 9B:
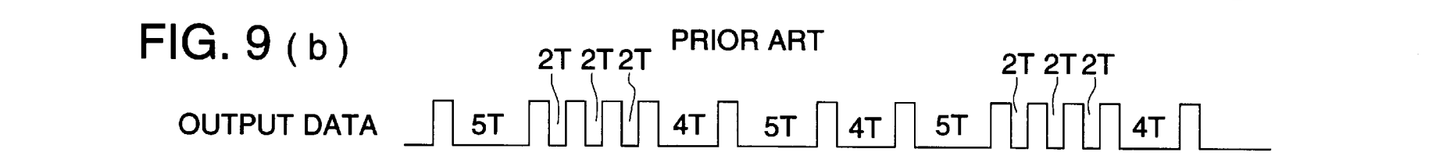
Figure 9C:
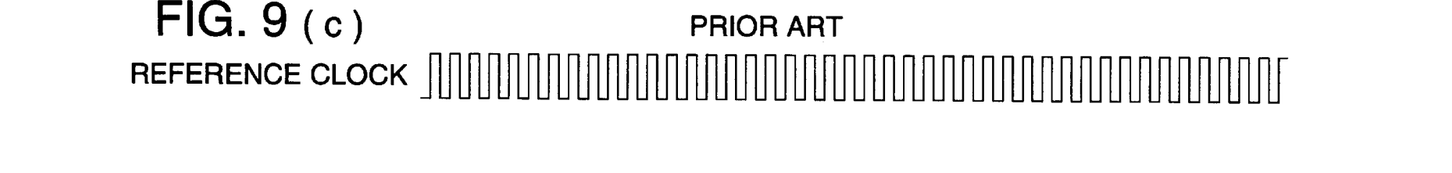

Slice level $f_{11}$ has plural stable points, and when variation of the slice level is faster than that of a signal waveform, there is a possibility that the slice level is stabilized at the wrong position. FIG. 9 is a diagram of normal operations of the conventional apparatus, wherein (a) shows relation between reading signal A and slice level B, (b) shows output data, and (c) shows reference clock.

In the case of normal operations, slice level B is stabilized at its correct position. Therefore, binary output data are generated at correct timing as shown in (b). A distance between output pulses in this case is varied to be 5T, 2T, 2T . . . .

Figure 10:
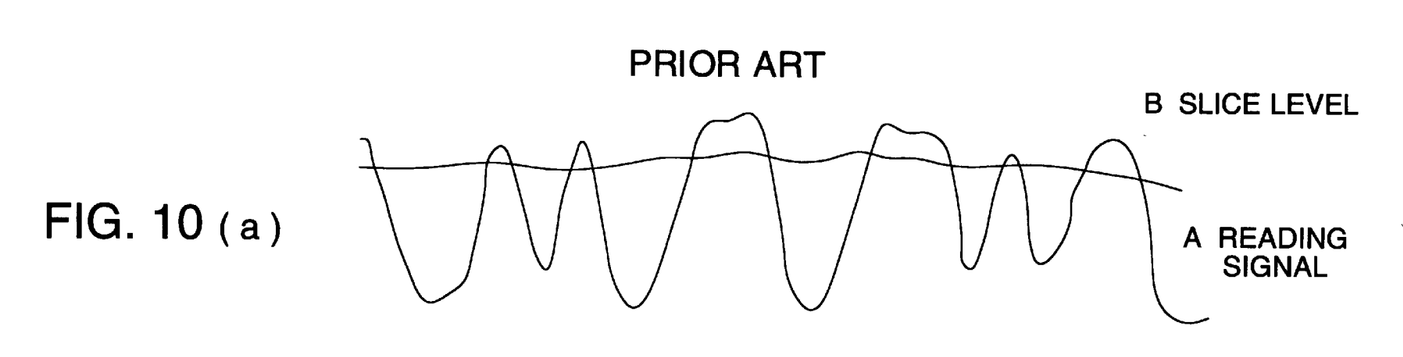
FIGS. 10(a) to 10(c) are diagrams of abnormal operations of the conventional apparatus.

FIG. 10 is a diagram of abnormal operations of the conventional apparatus. In this case, slice level B is stabilized at its wrong position (position shifted upward in the diagram) as shown in (a). This state tends to be caused when a medium is defective or when an amplitude is shifted, in the case of rapid following of slice level B. The cause of such phenomenon lies partly in a capacitor of AC coupling section 12 which is made small and its cut-off frequency is set to be higher. Therefore, binary output data are generated as shown in (b), and a distance between output pulses is quite different from that in the normal state to be 6T, 4T, 6T . . . , which makes reproduction of correct data impossible.

SUMMARY OF THE INVENTION

The invention has been achieved in view of the problems stated above, and its object is to provide an optical disk signal reading apparatus capable of reproducing correct data constantly.

The invention which solves the problems stated above is represented by an optical disk signal reading apparatus that reads information recorded on an optical disk medium, wherein cut-off frequency of an AC coupling section that cuts DC components of output from an photodetector is set to be not more than the frequency which is 80 times the rotational frequency of an optical disk, and there is provided a slice level following means which makes the slice level in a data reproducing means which reproduces data read by the photodetector to follow based on a peak value and a bottom value of signals to be read.

The structure of the invention makes it possible to set the slice level at an optimum level constantly, and thereby to reproduce correct data, by setting cut-off frequency to be lower than the conventional one, and thereby by making the variation of slice level small by making the variation of DC level of reading signal output small, and by making the slice level in a data reproducing means to follow based on a peak value and a bottom value of the reading signal.

In this case, it is characterized that there is provided a holding means which holds an output of the above-mentioned slice level following means.

In the structure of the invention, the slice level after synchronization can be maintained constant and binary-coding of output data can be carried out stably, when an output of the slice level following means is held by a holding means.

DETAILED DESCRIPTION OF THE PREFERRED EMBODIMENT

An embodiment of the invention will be explained as follows, referring to the drawings.

Figure 1:
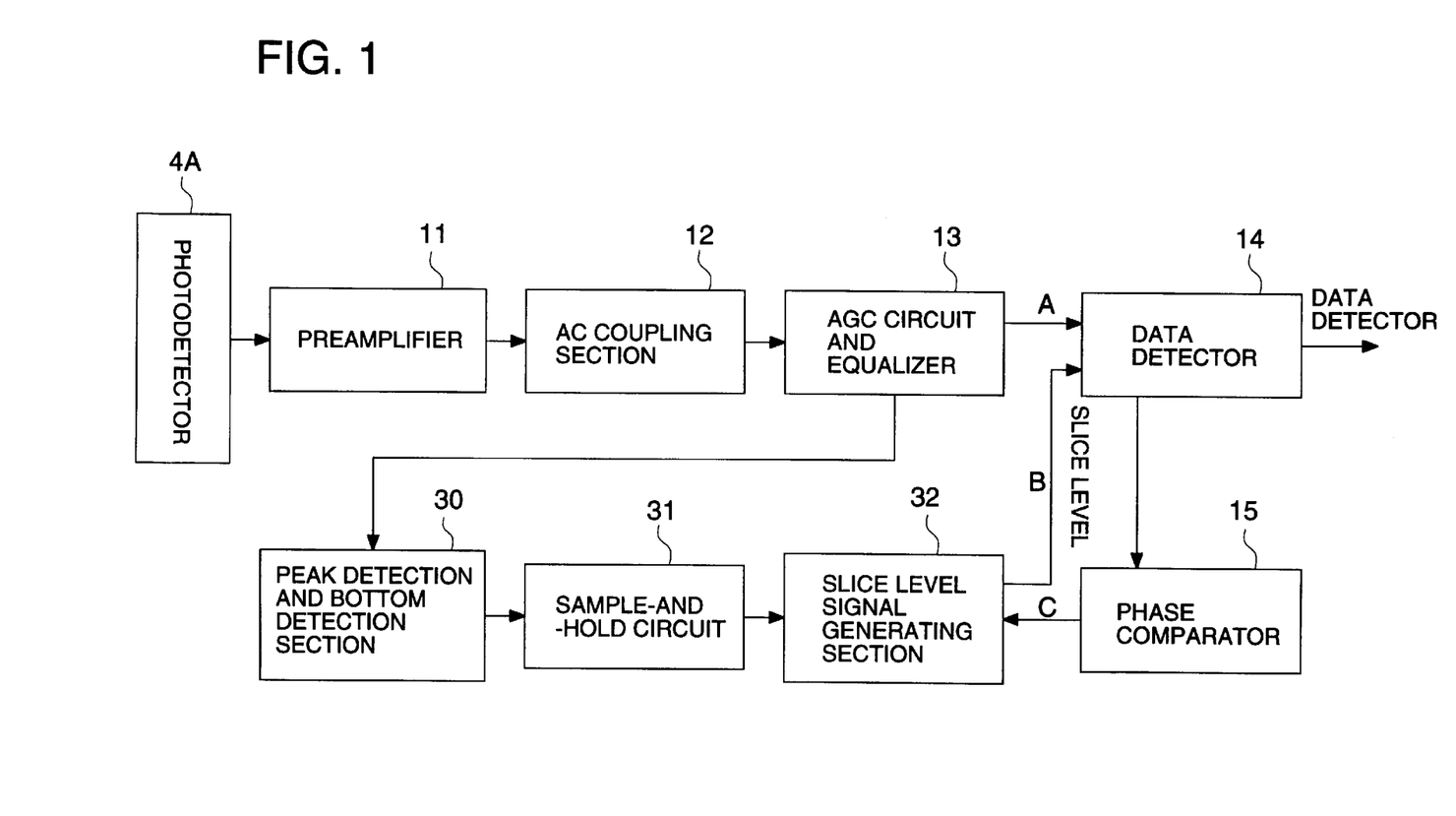
FIG. 1 is a block diagram showing an embodiment of the invention.

FIG. 1 is a block diagram showing an embodiment of the invention. Structural elements in FIG. 1 which are the same as those in FIG. 7 are given the same symbols as in FIG. 7. In the drawing, 4A represents a photodetector for photo/electrical conversion which is one of structural elements of optical pickup 4 (see FIG. 6). As the photodetector 4A, a photodiode, for example, is used.

The numeral 11 is a preamplifier which receives an output of the photodetector 4A and amplifies signals, while the numeral 12 is an AC coupling section for removing DC components. A cut-off frequency of the AC coupling section 12 is established at the frequency (for example, approx. 300 Hz to be concrete) which is about 5 times the rotational frequency of an optical disk and is much lower than about 50 kHz of the conventional apparatus. This is to greatly restrain the fluctuation of DC components after the passage through the AC coupling section 12. It is possible to establish the cut-off frequency of the AC coupling section at an appropriate value by changing a circuit constant of the time constant circuit composed of capacitor C and resistor R.

The numeral 13 represents an AGC and equalizer composed of an AGC circuit which keeps an amplitude of a reading signal passing through the AC coupling section 12 constant and of a filter which removes a noise contained in the reading signal. From the AGC and equalizer 13, there is outputted reading signal A which has been subjected to wave-shaping and has less noise.

The numeral 14 is a data detector which compares an output (reading signal A) of the AGC circuit and equalizer 13 with slice level B and converts analog signals into binary-coded signals. The numeral 15 is a phase comparator which receives the binary-coded data outputted from the data detector 14, and obtains phase difference $\Delta\theta$ from a reference clock to output it as error signal C.

The numeral 30 represents a peak detection and bottom detection section which receives an output of the AGC circuit and equalizer 13 and detects its peak value and a bottom value. The numeral 31 is a sample-and-hold circuit which samples an output of the peak detection and bottom detection section 30 and holds it. The sample-and-hold circuit 31 is so arranged that it holds an output of the peak detection and bottom detection section 30 when the reference clock and reading signal A are synchronized with each other.

The numeral 32 represents a slice level signal generating section which receives an output of the sample-and-hold circuit 31 and an output of the phase comparator 15, and makes slice level B to follow reading signal A based on the peak value and the bottom value of the reading signal A and on error signal C. Operations of the apparatus structured as stated above will be explained as follows.

Reflected light from optical disk medium 1 (see FIG. 6) is converted by photodetector 4A which constitutes optical pickup 4 into electrical signals which are subjected to signal amplification in preamplifier 11.

In an output of the preamplifier 11, double refraction owned by the optical disk medium and DC (direct current) components caused when the non-signal state is changed to the signal state are superposed, and they are varied. For removing this DC component, an output of the preamplifier 11 enters AC coupling section 12, and signal components having the prescribed value or higher of frequency only are transmitted. In this case, cut-off frequency of the AC coupling section 12 is set to be not more than the frequency which is about 80 times the rotational frequency of an optical disk which is slightly lower than the frequency of a conventional apparatus. Accordingly, the frequency of frequency components of the reading signal passing through the AC coupling section 12 is not lower than the above-mentioned frequency. By establishing the cut-off frequency of the AC coupling section 12 to be slightly lower, it is possible to lessen the fluctuation of DC level in reading signals passing through the AC coupling section 12 greatly.

An output (reading signal) of the AC coupling section 12 enters the AGC circuit and equalizer 13 where an amplitude is automatically made to be constant and noise components are removed by a filter. Thus, the output (reading signal A) of the AGC circuit and equalizer 13 turns into the signal that is free from noise components. Output A of the AGC circuit and equalizer 13 enters an input on the one side of the data detector 14.

Into an input on the other side of the data detector 14, there is inputted slice level signal B. Then the data detector 14 compares reading signal A with slice level signal B, and converts it into binary data composed of "0" and "1". From the data detector 14, there are outputted binary-coded output data.

On the other hand, binary-coded data signals are outputted from the data detector 14 to phase comparator 15, and the phase comparator 15 obtains phase difference $\Delta\theta$ between reference clock and the binary data, and outputs this phase difference $\Delta\theta$ to slice level signal generating section 32 as error signal C. The slice level signal generating section 32 receives an output of the sample-and-hold circuit 31 and error signal C from phase comparator 15, and outputs the value obtained by adding the error signal C to the output of the sample-and-hold circuit 31 as slice level signal B.

In the invention, a peak level and a bottom level of reading signals are detected by the peak detection and bottom detection section 30, and a prescribed level between the peak value and the bottom value is outputted to be supplied to the sample-and-hold circuit 31. Therefore, slice level B generated by slice level signal generating section 32 follows the fluctuation of reading signal A and turns into the value containing error signal C added thereto, whereby data detector 14 receiving the slice level signal B can generate correct reproduction data from the reading signal A as output data.

In the present embodiment, as stated above, when the cut-off frequency is established to be slightly lower than the conventional one (50 kHz→not more than the frequency that is 80 times the rotational frequency of an optical disk), the fluctuation of DC level in reading signal output can be made small and thereby the fluctuation of a slice level can be made small, while when a slice level following means (peak detection and bottom detection section 30) is used to cause a slice level in a data reproduction means (data detector 14) to follow based on the peak value and the bottom value of the reading signal, the slice level can constantly be established to be optimum, and thereby correct data can always be reproduced. Since the invention makes it possible to generate slice level B slowly, it is overcome that the slice level is set earlier than the reading signal or it is set at the improper position for stabilization, as in the conventional apparatus.

In the case of a 640 MB disk, there is a high possibility that a signal waveform distortion caused by AC coupling for DC fluctuation may appear in a re-synchronization (re-synchronization signal which converts a signal) interval. When the signal waveform distortion in a re-synchronization interval is great, the slice level needs to vary greatly. When the slice level fails to follow the great fluctuation properly, errors may be caused in data reproduction. It is therefore necessary that the signal waveform distortion in a resynchronization interval is within a certain range.

When the signal waveform distortion in a resynchronization interval is considered in terms of a decay rate, experiments indicate that the decay rate needs to be—10% or less. When this is indicated with an expression, the relation of the following expression needs to be satisfied;

$$0.9 \leq \exp(-t/T) \quad (1)$$

wherein, "t" represents a re-synchronization interval (s), and "T" represents a time constant of AC coupling.

Expression (1) is lead to the following expression.

$$t \leq 1/10 \, T \quad (2)$$

Cut-off frequency $v_{cut}$ of AC coupling can be shown with the following expression.

$$v_{cut} = 1/T \quad (3)$$

Further, since the maximum re-synchronization interval is about 1/800 of the circumference of an optical disk, t can be indicated with the following expression;

$$t = 1/800 \cdot 1/v \quad (4)$$

wherein, v represents a rotational frequency of an optical disk.

When substituting Expressions (3) and (4) for Expression (2), the following relation is obtained.

$$80v \geq v_{cut} \quad (5)$$

Namely, when the cut-off frequency is not more than 80 times the rotational frequency of the optical disk, the signal waveform distortion in a re-synchronization interval can be regarded to be within an allowable range.

Between cut-off frequency $v_{cut}$ of AC coupling and a time constant of AC coupling, there is relation of Expression (3), and when T is too great, the fluctuation in a changing section of signal waveform is also too great. Experiments $1/10v \leq v_{cut}$ in terms of rotational frequency of an optical disk is preferabe.

From the foregoing, the range of $1/10v \leq v_{cut} \leq 80v$ is preferable for obtaining an appropriate slice level, because that range makes the signal waveform distortion to be established within a prescribed range.

In this case, by providing a holding means (sample-and-hold circuit 31) which holds an output of the slice level following means, it is possible to hold an output of the slice level holding means by means of a holding means, to maintain the slice level after synchronization constant, and to conduct binary-coding of output data stably.

Figure 2:
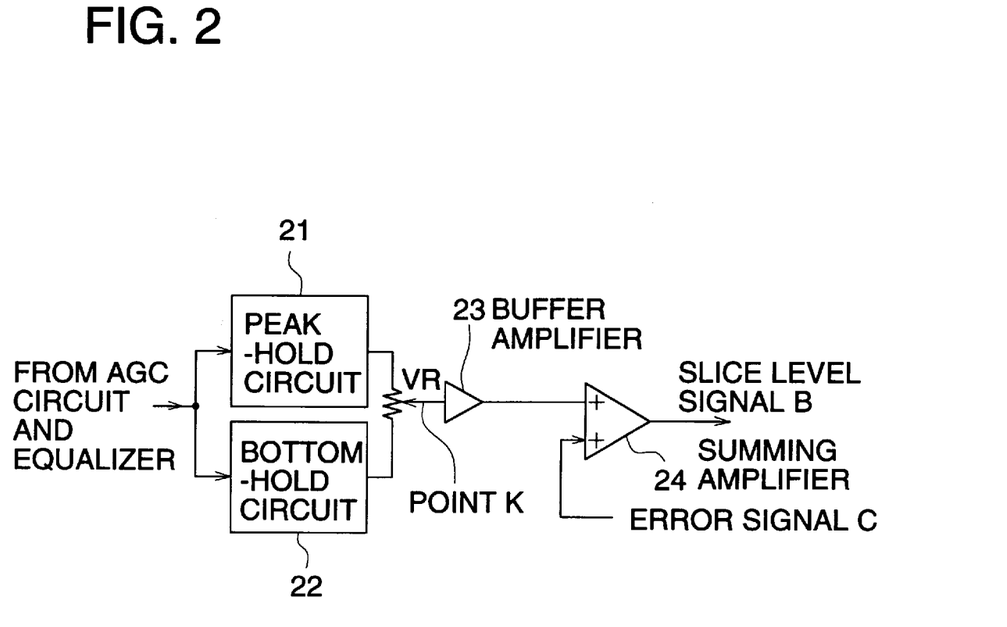
FIG. 2 is a circuit diagram showing an embodiment of a slice level generating section.

FIG. 2 is a circuit diagram showing an embodiment of a slice level generating section wherein peak detection and bottom detection section 30 and slice level signal generating section 32 both shown in FIG. 1 are combined. Though the sample-and-hold circuit 31 is not shown in this embodiment, it is not always necessary when an output of the peak detection and bottom detection section 30 is stabilized.

In FIG. 2, the numeral 21 is a peak holding circuit which receives signals from the AGC circuit and equalizer 13 and holds the peak value, while the numeral 22 is a bottom holding circuit which receives signals from the AGC circuit and equalizer 13 and holds the bottom value. These peak holding circuit 21 and bottom holding circuit 22 can be realized by the use of existing technologies such as a peak rectifier circuit employing a diode and an operational amplifier.

The symbol VR represents a resistance voltage divider connected between an output of the peak holding circuit 21 and that of the bottom holding circuit 22, while the numeral 23 is a buffer amplifier into which voltage dividing signals of the resistance voltage divider VR are inputted. The buffer amplifier 23 is an impedance converting amplifier having characteristics of high input impedance and low output impedance. These peak holding circuit 21, bottom holding circuit 22, resistance voltage divider VR and buffer amplifier 23 constitute the peak detection and bottom detection section 30 shown in FIG. 1.

The numeral 24 is a summing amplifier which receives on its input on the one side thereof an output of the buffer amplifier 23 and receives on its input on the other side thereof error signal C coming from phase comparator 15 to add them, and generates slice level signal B. This summing amplifier 24 constitutes slice level signal generating section 32 shown in FIG. 1. Operations of the circuit structured as stated above are explained as follows.

Figure 3:
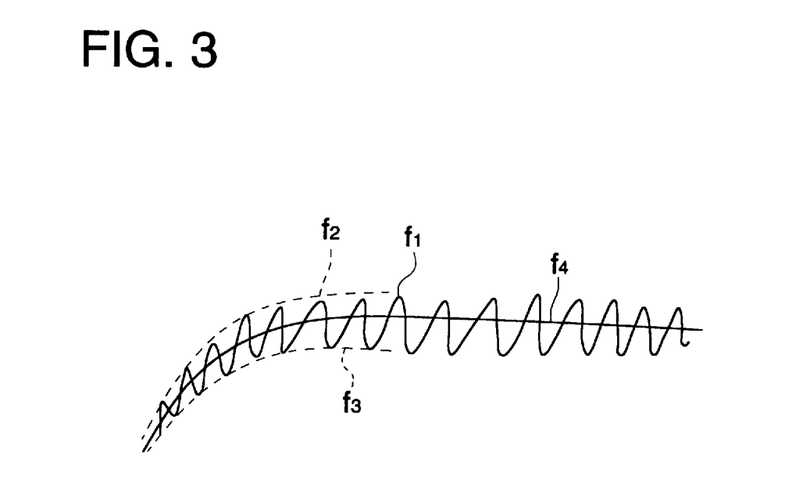
FIG. 3 is a diagram of operating waveforms.

When signals from optical disk medium 1 are read by optical pickup 4 (see FIG. 6), an output (reading signal A) of AGC circuit and equalizer 13 rises as shown with $f_1$ in FIG. 3. An output of peak hold circuit 21 which receives the reading signal rises as shown with $f_2$ in FIG. 3 and an output of bottom hold circuit 22 rises as shown with $f_3$ in FIG. 3.

As a result, a signal (signal at point K in FIG. 2) taken out of resistance voltage divider VR is always between $f_2$ and $f_3$, resulting in those shown with $f_4$ in FIG. 3. The summing amplifier 24 adds the signal at point K and the error signal C to generate slice level signal B. Therefore, the slice level B always shows a value which is obtained by adding the error signal C to the level which is about a middle of the reading signal A. Since the slice level B is always generated following the reading signal A, a problem that the slice level B is established preceding the reading signal A is solved. Further, since the error signal C is also taken into consideration, output data are neither outputted preceding the reference clock nor outputted following the reference clock. Namely, in the present embodiment, output data can be stabilized, and phase correction operations similar to those of the conventional apparatus shown in FIG. 8 can be conducted.

Figure 4:
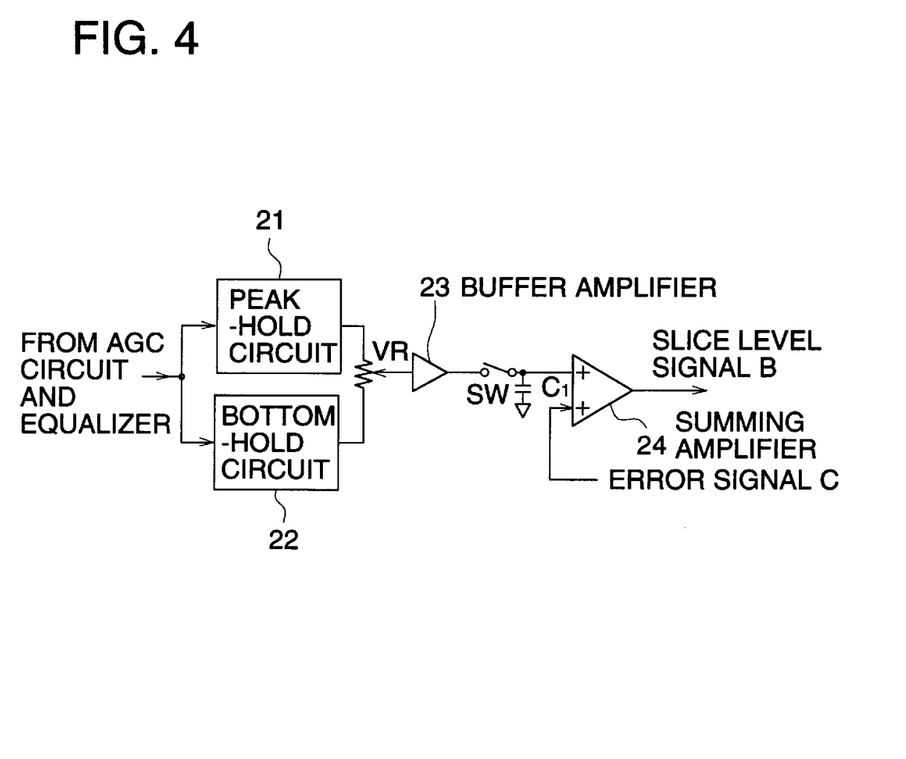
FIG. 4 is a circuit diagram showing another embodiment of a slice level generating section.

FIG. 4 is a circuit diagram showing another embodiment of a slice level generating section. Structural elements in FIG. 4 which are the same as those in FIG. 2 are given the same symbols as in FIG. 2. In the present embodiment, peak detection and bottom detection section 30, sample-and-hold circuit 31 and slice level signal generating section 32 in FIG. 1 are combined.

The sample-and-hold circuit 31 is composed of switch SW and capacitor $C_1$. An output of buffer amplifier 23 is connected with the switch SW whose end portion is connected with the capacitor $C_1$. A contact point of the switch SW is turned on (closed) first, and it is turned off after synchronization. As a result, an output of the buffer amplifier 23 after synchronization is held in the capacitor $C_1$, whereby slice level B is stabilized.

In the present embodiment, an output of a slice level following means (peak detection and bottom detection section 30) is held by a holding means (sample-and-hold circuit 31), and thereby a slice level after synchronization can be maintained constant and binary-coding of output data can be carried out stably.

FIG. 5 is a diagram of effects of the invention. FIG. 5 (a) shows an operating waveform in the invention, and FIG. 5 (b) shows an operating waveform in the conventional example. In the drawing, $f_{10}$ represents reading signal A, $f_{11}$ represents slice level B, and $f_{12}$ represents DC level fluctuation on an output section of AC coupling section 12.

In FIG. 5 (a), reference clock generating area 1 is an area where a reference clock for phase comparison is generated, an address of each sector is confirmed, and a reference clock is generated. Then, reference clock generating area 2 is an area where a reference clock for data reproduction is generated. After that, a data reading area follows.

A DC level shown in FIG. 5 (b) fluctuates greatly as shown in $f_{12}$, because a cut-off frequency of AC coupling section 12 is as high as 50 kHz or less. In the invention, on the contrary, the fluctuation is less as shown on $f_{12}$ in FIG. 5 (a), because a cut-off frequency of AC coupling section 12 is low to be not more than the frequency 80 times the rotational frequency of an optical disk. Accordingly, the fluctuation of slice level $f_{11}$ is also less, making it possible to carry out binary-coding in data detector 14 stably.

Incidentally, the invention may naturally be applied even when an optical disk medium of an edge recording system is any of CD, MO and DVD. Effect of the invention As stated in detail above, in the optical disk signal reading apparatus that reads information recorded on an optical disk medium, wherein cut-off frequency of an AC coupling section that cuts DC components of output from an photodetector is set to be not more than the frequency which is ten times the rotational frequency of an optical disk, and there is provided a slice level following means which makes the slice level in a data reproducing means which reproduces data read by the photodetector to follow based on a peak value and a bottom value of signals to be read, the structure of the invention makes it possible to set the cut-off frequency to be lower than the conventional one, and thereby to make fluctuation of slice level to be small by making the fluctuation of DC level of output of signal read to be small, and to make the slice level in a data reproducing means to follow based on a peak value and a bottom value of the signals read, and thereby to set the slice level at an optimum level constantly, as well as to reproduce correct data.

Further, in the structure of the invention, by providing a holding means which holds an output of the slice level following means, it is possible to maintain the slice level after synchronization constant and to carry out stably binary-coding of output data, by holding an output of the slice level following means with the holding means.

As stated above, the invention makes it possible to provide a signal reading apparatus for an optical disk capable of reproducing correct data constantly.

What is claimed is:

1. An apparatus for reading information recorded on an optical disk, comprising:
    a rotator to rotate the optical disk at a rotating frequency;
    a detector to read information recorded on the optical disk and to output reading signals corresponding to the information;
    an AC coupling section to filter the reading signal so as to eliminate frequency components lower than a predetermined cut-off frequency and to output the filtered reading signal, wherein the predetermined cut-off frequency is 1/10 to 80 times the rotating frequency of the rotator;

a slice level signal generator to generate a slice level signal;

a data detector having a binary comparator to compare the filtered reading signals with the slice level signal so as to output binary signals;

a phase comparator to generate a phase reference signal, to compare a phase of the binary signals with that of the phase reference signal, and to output a phase difference signal; and the slice level signal generator adjusting the slice level signal such that the phase of the binary signal coincides with that of the phase reference signal.

2. The apparatus of claim 1, wherein the slice level signal generator comprises a peak and a bottom detector to detect a peak value and a bottom value of the reading signal and generates the slice level signal based on the peak value and the bottom value.

3. The apparatus of claim 1, further comprising:

holding means for holding the slice level signals generated by the slice level signal generator.

* * * * *